(No Model.) 4 Sheets—Sheet 1.

M. R. SHERRERD.
MEANS FOR INSERTING VALVES IN PIPES OR MAINS.

No. 587,108. Patented July 27, 1897.

Fig.1.

Attest:
C. W. Benjamin
D. W. French

Inventor:
M. R. Sherrerd
by T. F. Bourne,
his atty (No Model.) 4 Sheets—Sheet 3.
M. R. SHERRERD.
MEANS FOR INSERTING VALVES IN PIPES OR MAINS.
No. 587,108. Patented July 27, 1897.

Attest:
C. W. Benjamin
D. W. ——

Inventor:
M. R. Sherrerd
by T. F. Bourne,
his atty (No Model.) 4 Sheets—Sheet 4.

M. R. SHERRERD.
MEANS FOR INSERTING VALVES IN PIPES OR MAINS.

No. 587,108. Patented July 27, 1897.

Attest:
C. W. Benjamin
D. W. French

Inventor:
M. R. Sherrerd
by T. F. Bourne,
his atty

UNITED STATES PATENT OFFICE.

MORRIS R. SHERRERD, OF NEWARK, NEW JERSEY.

MEANS FOR INSERTING VALVES IN PIPES OR MAINS.

SPECIFICATION forming part of Letters Patent No. 587,108, dated July 27, 1897.

Application filed March 1, 1897. Serial No. 625,560. (No model.)

*To all whom it may concern:*

Be it known that I, MORRIS R. SHERRERD, a citizen of the United States, residing in Newark, Essex county, New Jersey, have invented certain new and useful Improvements in Means for Inserting Valves in Pipes or Mains, of which the following is a specification.

Heretofore, as far as I am aware, in order to insert a valve in a pipe or main that was under pressure it was necessary to shut off the supply of water or fluid to the pipe. This necessitated the stoppage of water to a certain portion or section of a city or town, which was not only of disadvantage to the inhabitants, but was a great source of fire risk, in that it prevented the supply of water for fire purposes during the time that the valve was being inserted.

The object of my invention is to enable a valve—such, for instance, as a gate-valve—to be inserted in a pipe or main while the latter is under pressure, or, in other words, without stopping the flow of water or other fluid therethrough.

The invention consists in a divided or split casing or box adapted to be clamped around a pipe or main, means for securing it fluid-tight thereon, said casing or box having a passage-way or branch leading thereto, a valve to close said passage-way or branch, and a bonnet or cover removably connected with said passage-way or branch, in combination with a clamping device adapted to be secured upon the pipe or main within said casing or box and having means for securing a valve between its parts after a section of the pipe or main has been cut out and removed to admit a valve between said parts. By these means I am enabled to remove a section of pipe, to then insert a valve between the severed ends of the pipe, and to then clamp the valve firmly in that position without stopping the flow of water or fluid through the pipe. After the valve is thus clamped in position the casing or box is removed and the joint between the valve and the clamping device on the pipe or main may be packed or leaded to secure a tight joint to prevent leakage.

The invention also consists in a divided or split hub or sleeve having means for clamping it upon a pipe or main, in combination with another divided or split hub or sleeve also adapted to be clamped upon a pipe or main and having screw-threads upon its periphery, and with a divided or split ring having threads to mesh with the first-mentioned threads, and means for operating said ring to cause it to travel along the hub or sleeve upon which it is mounted, whereby a valve can be clamped between the severed ends of a pipe.

The invention also consists in the novel details of improvement and the combinations of parts that will be more fully hereinafter set forth, and then pointed out in the claims.

Reference is to be had to the accompanying drawings, forming part hereof, wherein—

In the accompanying drawings, in which similar numerals and letters of reference indicate corresponding parts in the several views, 1 is a pipe or main which we will suppose is buried underground.

2 is a box or casing which may be rectangular or of any other suitable shape and adapted to be secured around the pipe 1. I have shown the casing or box 2 as divided or split longitudinally or lengthwise of the pipe to enable it to be clamped around the pipe and provided with flanges $2^a$ and $2^b$, which are adapted to be held by bolts 3. (See Fig. 2.)

At opposite ends the box or casing 2 has apertures 4, adapted to receive pipe 1, and is also provided with hubs 5, which are divided or split and adapted to be clamped around said pipe. These hubs are shown provided with the usual annular recesses $5^a$ to receive packing or lead to make a tight joint around the pipe. The hubs 5 are provided with flanges 5$^b$ and 5$^c$ to receive bolts 6, whereby the hubs can be clamped upon the pipe, Figs. 2 and 3; but it is evident that other means than the said flanges, bolts, and screws can be provided for clamping the casing or box 2 and the hubs 5 upon the pipe. While the hubs 5 may be made integral with the respective parts of the casing or box 2, I find it convenient to make said hubs detachable therefrom, and for this purpose I have shown said hubs as provided with flanges 7, having apertures 7$^a$ to receive bolts or screws 7$^b$, carried by the respective part of the casing or box 2, whereby the hubs and the casing or box can be secured together while upon the pipe.

One advantage of having the detachable hubs 5 is that the apertures 4 in the casing or box 2 may be large enough to receive a certain sized pipe, say eight inches in diameter, and then two or more sets of hubs may be provided having bores of sufficient size to properly fit upon said eight-inch pipe and also upon smaller pipes, whereby one casing or box 2 can be utilized for inserting valves in pipes of varying sizes.

Figure 1:
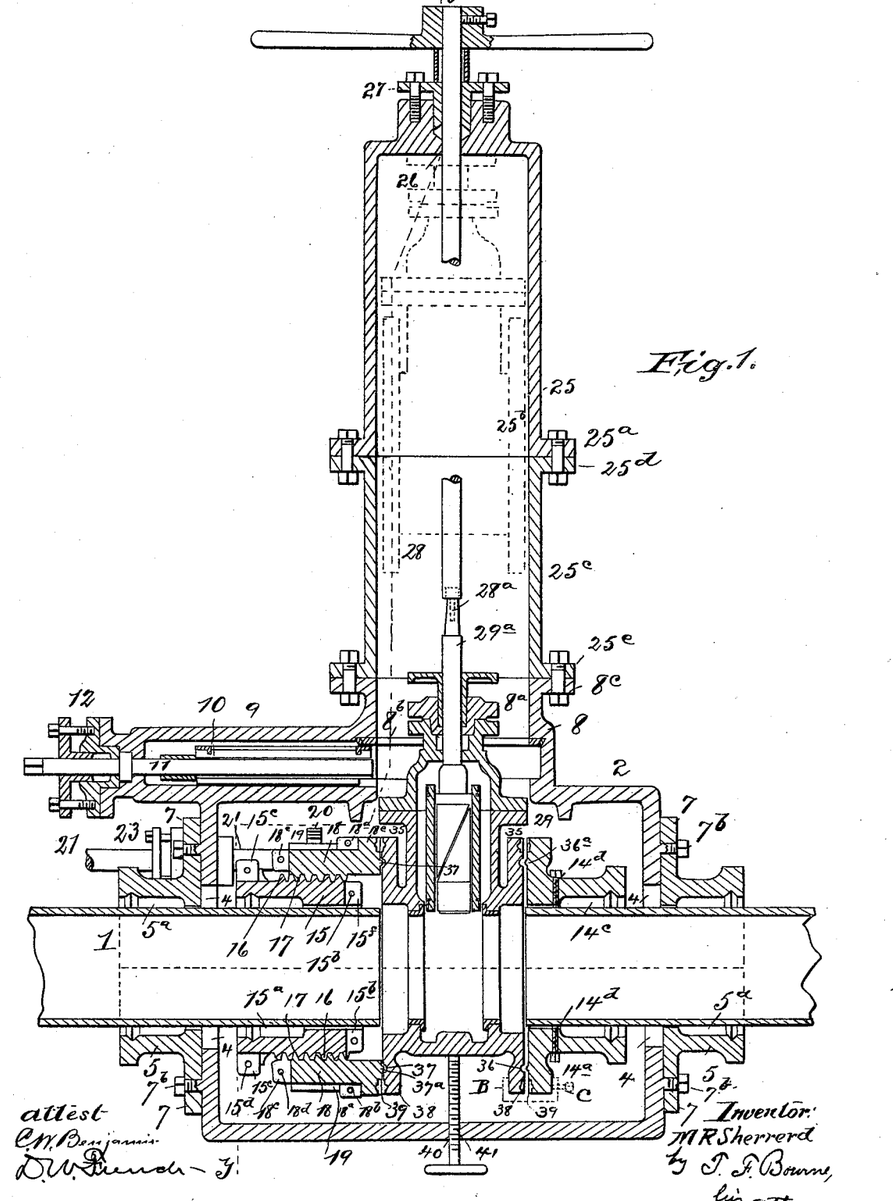
Figure 1 is a vertical longitudinal section of my improvements shown in position upon a pipe, illustrating a valve between the severed ends of a pipe and which is to be clamped in that position.
Figures 5, 6:
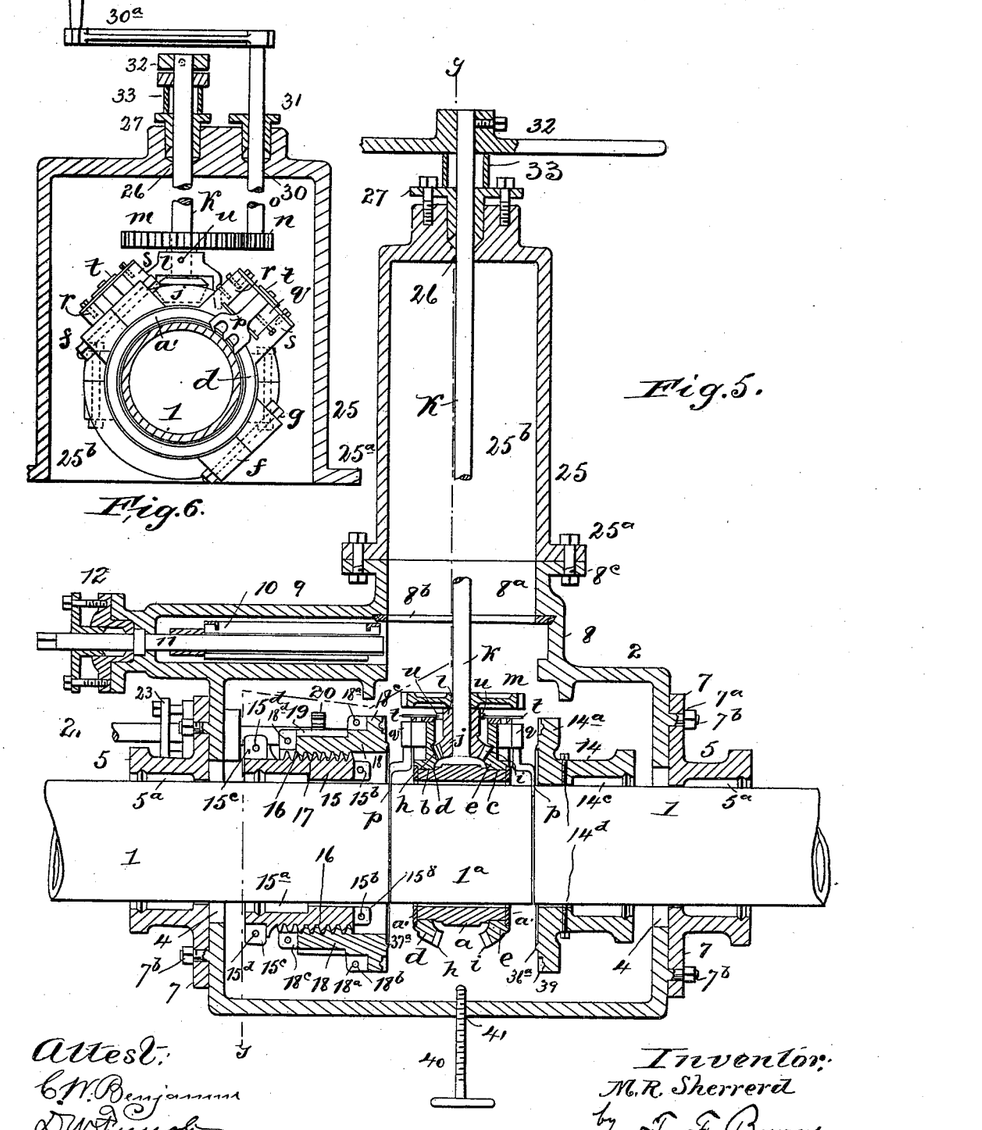
Fig. 5 is a view substantially corresponding to Fig. 1, excepting that means for cutting out the section of the pipe are shown instead of the valve shown in Fig. 1.
Fig. 6 is a detail sectional view at right angles to Fig. 5, showing the pipe-cutting device in the upper part of the bonnet or hood after a section of the pipe has been cut out ready for removal.

The box or casing 2, or rather one of its sections, has a branch or extension 8, provided with a passage-way 8$^a$, which leads to the interior of the casing or box, through which passage-way a pipe-cutting device and a valve may be passed. A suitable valve is provided for closing the passage-way 8$^a$, and for this purpose I have shown the branch or extension 8 as provided with a valve-chamber 9, in which is fitted a suitable valve 10, having a stem 11 projecting through an opening in the end wall of chamber 9. On the end of the chamber 9 is a suitable stuffing-box 12, through which stem 11 passes to make a tight joint, as shown in Figs. 1 and 5. The valve 10 is adapted to be moved across the passage-way 8$^a$, and in said passage-way is shown a seat 8$^b$ to receive the valve 10. By this means when the valve 10 is moved across the passage-way 8$^a$ said valve and the seat 8$^b$ will effectually close said passage-way to prevent the passage of water therefrom.

Within the casing 2, upon the pipe 1, are placed clamping devices at such a distance apart as to receive a pipe-cutting device between them, so that a section of pipe can be cut out and removed to permit a valve to be placed in the opening left by said cut-out section of pipe and to enable said valve to be firmly clamped between them. These clamping devices may be described as follows:

14 is a divided or split hub or sleeve, shown provided at one end with an annular flange 14$^a$ and with flanges 14$^b$ along the divided edges to receive bolts or screws whereby the hub or sleeve 14 can be clamped upon the pipe. The hub or sleeve 14 is provided with an annular recess 14$^c$ to enable said hub or sleeve to be packed or leaded upon the pipe, and, by preference, set-screws 14$^d$ are carried by the hub or sleeve to hold the latter from sliding along the pipe. By these means the hub or sleeve 14 can be firmly and permanently secured upon the pipe, so as to make a tight joint therewith.

15 is another divided sleeve having an annular recess 15$^a$ to receive packing or lead and also provided with projections or lugs 15$^f$ at one end, having apertures 15$^b$ and lugs or ears 15$^c$ projecting outwardly therefrom at the opposite end and provided with apertures 15$^d$. These apertures 15$^b$ and 15$^d$ are adapted to receive bolts or screws to enable the divided or split hub or sleeve 15 to be firmly clamped upon the pipe. The hub or sleeve 15 also, by preference, carries set-screws 15$^e$ to prevent the hub or sleeve from sliding along the pipe. Upon the periphery of the hub or sleeve 15 are screw-threads 16, adapted to receive and mesh with corresponding threads 17, that are carried within a ring 18, that is adapted to be clamped around the hub 15. The ring 18 is shown provided at one end with an annular flange 18$^e$ and with lugs 18$^a$, having apertures 18$^b$, and with lugs 18$^c$ at the other end, having apertures 18$^d$ to receive bolts or screws to hold the ring around the hub or sleeve 15.

Figure 4:
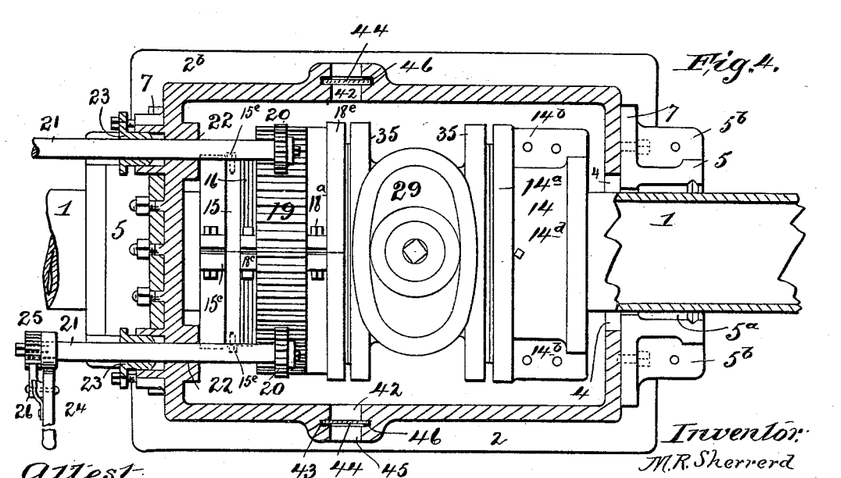
Fig. 4 is a horizontal section on the line 4 4 in Fig. 3.

It will be understood that as ring 18 is rotated around the sleeve or hub 15 it will be caused to travel longitudinally thereon by means of threads 16 17. It is designed that the ring 18 shall be moved along the sleeve or hub 15 while inclosed within the casing or box 2. For this purpose the ring 18 is shown provided with peripheral gear-teeth 19, that are adapted to be engaged by pinions or gear-wheels 20, whereby as the latter are revolved the ring 18 will be rotated on hub or sleeve 15 to cause it to travel along the latter. Two pinions or gear-wheels 20 are shown carried by shafts 21, which project through apertures 22 in the wall of the casing, (see Fig. 4,) which apertures form bearings for said shafts. 23 are suitable stuffing-boxes secured upon the casing 2 in line with the apertures 22 and through which the shafts 21 pass, whereby water-tight joints may be provided for the shafts. The shafts 21 may be rotated by any suitable means. In Fig. 4 I have shown a lever 24 with a ratchet 25 and a pawl 26 for rotating the shaft. This will be a convenient means, as the shafts can only be turned intermittently because of the presence of the pipe 1, as the pipe would prevent the rotation of a sufficiently long handle; but of course other means may be provided for rotating shaft 21. I have shown two shafts 21 and pinions or gear-wheels 20, for the reason that if one shaft or pinion should break the other will be ready for use, whereas if only one were used and it should break great inconvenience might occur; but it is evident that one shaft 21 and wheel or pinion 20 can be used, if desired.

From the foregoing it will be understood that the ring 18 can be caused to travel toward or from the sleeve or hub 14, and it is designed to clamp a valve between the ring 18 and the sleeve or hub 14 after a section of the pipe has been cut out between said ring and hub. Any suitable means may be provided for cutting out a section of the pipe to admit a valve. I have shown a pipe-cutter that is adapted to be clamped upon the pipe between the ring 18 and the hub or sleeve 14 and to operate within the casing 2 while upon the pipe, and to then be withdrawn from said casing and to carry the cut-out section of pipe with it.

In Fig. 5 I have shown the pipe-cutter in position within the casing upon the pipe and the cut in the pipe made, and I will now describe how a section of the pipe may be cut out in order to admit a valve between the ring 18 and the sleeve or hub 14, as shown in Fig. 1. The pipe-cutter may be described as follows:

$a$ is a frame which is divided crosswise and adapted to be clamped by means of bolts upon the pipe 1 within the casing 2. The frame $a$ has two parallel peripheral annular guideways $b\ c$, upon which cutter carriers or rings $d\ e$ are adapted to be clamped and rotated. The carriers $d\ e$ are divided crosswise and provided with lugs $f$, adapted to receive bolts $g$ to bolt them upon the frame $a$.

$a'$ are rings adapted to be secured to frame $a$ outside of the carriers $d\ e$ to hold the latter in place. The carriers $d\ e$ have gear-teeth $h$ and $i$, adapted to be engaged by a pinion or gear-wheel $j$, carried by a shaft $k$, journaled in a yoke or bridge $l$, carried by frame $a$. Shaft $k$ may be rotated direct to rotate carriers $d\ e$; but I have shown it provided with a gear-wheel $m$, that meshes with a pinion $n$, carried by a shaft $o$. (See Fig. 6.) Cutters $p$ are shown carried by sliding heads $q$, guided in ways $r\ s$, carried by the cutter carriers or rings $d\ e$. To the heads $q$ are connected star-wheels $t$, adapted to engage studs $u$, carried by yoke $l$ or frame $a$ to feed the tools intermittently as the cutter-carriers rotate. By this arrangement the cutter-carriers rotate around the pipe in opposite directions at the same time to make two cuts in the pipe in parallel planes at such a distance apart as to cut out a section $1^a$ of the pipe between the ring 18 and the sleeve 14, so that the section of pipe thus cut out can be lifted from between said ring and sleeve out of the casing 2.

25 is a bonnet or cover having a flange $25^a$, adapted to be bolted upon flange $8^c$ of casing 2, (see Fig. 5,) said bonnet or cover having a chamber $25^b$, alined with the opening or passage-way $8^a$ of branch 8 and of such dimensions as to receive the pipe-cutter within it, and, by preference, to receive a valve to be inserted between the severed ends of the pipe, both above the plane of valve 10. (See Fig. 5.) The bonnet or cover 25 has a bearing 26 and a stuffing-box 27 to receive shaft $k$ of the pipe-cutter, (see Figs. 5 and 6,) as well as a rod or tube 28 to be attached to the valve 29 when that is to be lowered into position between the ring 18 and sleeve 14. (See Figs. 1 and 2.) The bonnet 25 also has a bearing 30 and a stuffing-box 31 to receive shaft $o$ when the pipe-cutter is to be operated, (see Fig. 6;) but when the valve is to be lowered this stuffing-box will be closed or plugged. Any suitable means, such as a handle or crank $30^a$, may be attached to the shaft $o$ for rotating the latter to turn shaft $k$, and the shaft $k$ may have a suitable handle 32 above the stuffing-box 27 by which to raise and lower the pipe-cutter. A tube 33, interposed between said handle and said stuffing-box, serves to sustain the pipe-cutter when the pipe is cut through. The two shafts $k$ and $o$ serve to resist turning or twisting of the pipe-cutter upon the pipe.

With the devices above described, if the the pipe is underground a suitable excavation will be made around the point where the valve is to be inserted, and the pipe-cutter will then be clamped upon the pipe at the point where the section $1^a$ is to be cut out and the operating devices set in position for work and part of the cut made, if desired. The sleeve or hub 14 will then be clamped upon the pipe, held in position by the set-screws $14^d$, and leaded upon the pipe adjacent to one side of the pipe-cutter, sufficient clearance being given to enable the removal of the pipe-cutter and cut-out section after the section $1^a$ is cut out. The sleeve or hub 15 will be clamped upon the pipe on the side of the cutter opposite the sleeve 14 and so adjusted as to make the annular flanges of sleeve 14 and the ring 18 parallel, (when the latter is in place outside of sleeve 15,) but at such a distance from said cutter as will permit the removal of the pipe-cutter and the ready insertion of a valve between the flanges of sleeve 14 and ring 18 when the latter is in place. (See Fig. 5.) In this position it (the sleeve 15) may be held in place by the set-screws $15^e$ and leaded. The ring 18 will be clamped around sleeve 15 at such a distance from the pipe-cutter as will permit the ready withdrawal of the latter and the insertion of the valve 29. The casing 2 will next be clamped around the pipe, so as to inclose the pipe-cutter and the clamping devices 14 15 18, &c. The hubs 5 will be adjusted upon the pipe secured to the casing and leaded, the shafts 21 and their pinions or wheels 20 meanwhile being adjusted in position, so that said pinions or wheels will mesh with the gear-teeth 19 of the ring 18. The valve 10 being drawn into its chamber 9, the bonnet or cover 25 will next be clamped upon the flange $8^c$ of branch 8, so that the shafts $k\ o$ will project through their respective bearings and stuffing-boxes on said bonnet and be in position to operate the pipe-cutter. It will thus be seen that the operating parts are closed within the casing 2 and the bonnet 25. The pipe-cutter may then be operated to cut out the section $1^a$ from pipe 1, and the pipe-cutter with its attached section can then be lifted from the casing or box 2 into bonnet 25, as in Fig. 6. Water will now of course fill the casing 2 and bonnet 25, and thereupon valve 10 will be closed to confine the water within casing 2. By means of a cock A, carried by branch 8, the water can be drained from the bonnet 25. The bonnet 25 with the contained pipe-cutter and section 1ª of the pipe can now be removed. The next step is to insert a valve 29 in the space left by the cut-out section 1ª of the pipe between the flanges of the sleeve 14 and the ring 18. The arrangement for this purpose and for making a tight joint between the sides of the valve-casing and the clamping devices 14, 15, and 18 upon the pipe are as follows:

The flanges or hubs 35 of valve 29 are shown provided with annular grooves 36 37, that are adapted to receive corresponding annular ribs 36ª 37ª, carried by the sleeve 14 and the ring 18, respectively. (See Fig. 1.) These are useful in guiding the valve into position and also to compress flexible packing which may be previously secured to the face of flanges of sleeve 14 and ring 18. The corresponding faces of the flanges 35 of the valve and the sleeve 14 and the ring 18 are also preferably provided with annular grooves 38 39, which are adapted to register when the valve is brought in proper position between sleeve 14 and ring 18. These grooves 38 39 are provided for the purpose of receiving packing or lead after the valve is set in position, so as to secure a permanent water-tight joint around the pipe. Any suitable or well-known type of valve—such, for instance, as a gate-valve—may be used for insertion between the severed ends of the pipe, the only requirements being that suitable means be provided between the flanges of the valve and the sleeve 14 and ring 18 to enable a tight joint to be established.

I have shown a gate-valve 29 in section in Fig. 1, and the gate may be open when the valve is inserted in the pipe, thus avoiding the necessity of stopping the flow of water or fluid through the pipe until such a time as it may be desirable so to do.

Figure 2:
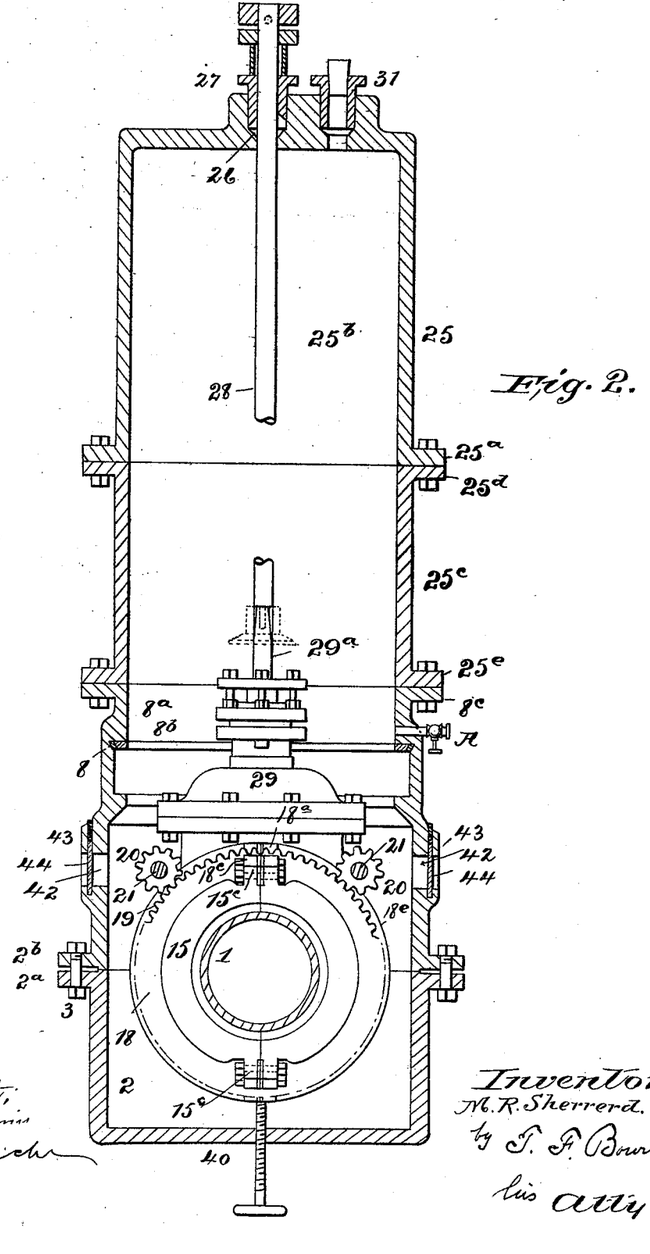
Fig. 2 is a vertical cross-section through the casing and bonnet or cover, looking from the left in Fig. 1, on the line $y\ y$.
Figure 3:
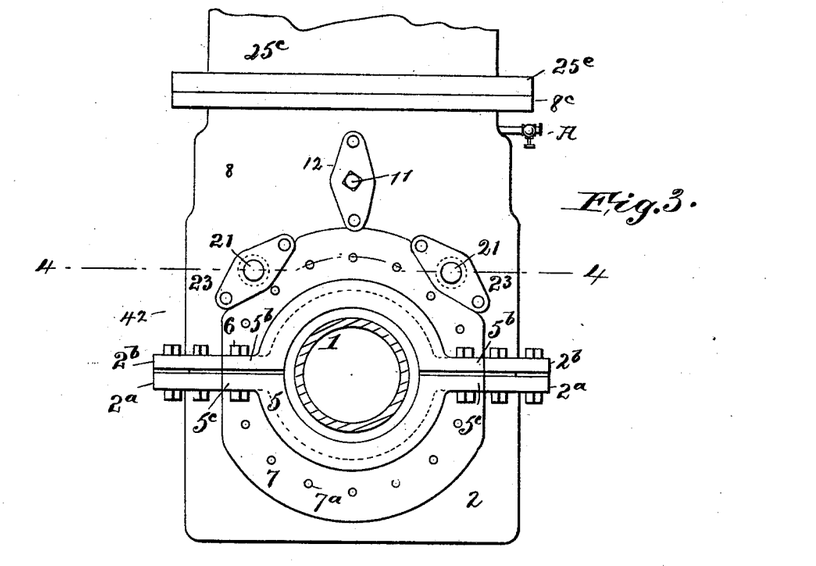
Fig. 3 is a side elevation of the casing or box, illustrating the means for applying the casing or box to the pipe.

40 is a screw or stop shown located in a threaded aperture 41 in the bottom of casing 2, whereby it may be adjusted up or down, according to the size of the valve to be inserted, so as to insure that the valve will come to rest in the proper position relatively to pipe 1 when it is lowered into casing 2; but any other suitable stop may be provided for this purpose. The particular function of the grooves 36 37 and ribs 36ª and 37ª is to insure that the valve will be brought to a proper position when the clamping devices are brought against the valve. These grooves and ribs, furthermore, serve as a packing to make a tight joint between the clamping devices and the valves and assist in sustaining the valve in position between said clamping devices when the casing is removed and before lead packing is filled into the grooves 38 39; but any suitable packing may be interposed between parts 14 and 18 and the valve-flanges, if desired.

For the further purpose of assuring that the valve will be brought to the proper position in the cut-out portion of the pipe I may provide peep-holes 42 in the opposite sides of the casing 2. These peep-holes will be provided with suitable glass, and they are shown in line in the opposite walls of the casing, (see Figs. 2 and 4,) so that a clear sight can be had through the casing in line with the joint between the valve and ring 18, by which means it can be seen when the grooves 37 and rib 37ª are in line. For the purpose of enabling the pressure of water to be resisted at the peep-holes I have shown pockets 43 cast on the side of the casing and provided with a groove or recess to receive the glass 44. These pockets have an opening 45, alined with the peep-holes 42, and the upper surfaces of the pockets 43 are open to enable the glass to be slid in, and packing may be placed above the glass to prevent leakage. By preference packing 46 will be interposed between the pocket 43 and the glass 44 to resist the water-pressure to prevent breakage of glass.

The valve may be lowered into the casing 2 by means of the bonnet or cover 25, and its chamber 25ᵇ should be of sufficient volume to receive the valve within it, the passage-way 8ª also being of sufficient volume to permit the passage of said valve. As the valve and its stem are longer than the bonnet or hood 25, as shown, I have provided an intermediate hollow case or shell 25ᶜ, having a flange 25ᵈ to be bolted to the flange 25ª and the flange 25ᵉ to be bolted to flange 8ᶜ of branch 8. (See Fig. 2.) By this means the bonnet 25 will be raised sufficiently high above the valve 10 to enable the gate-valve 29 to be contained within a closed chamber above the valve 10 while in line with the passage-way 8ª of branch 8, as in dotted lines in Fig. 1; but it is evident that the bonnet 25 could be of sufficient length to receive the valve 29 without the interposed shell 25ᶜ; but in that case, when the same bonnet is to be used in connection with the pipe-cutter and the valve, shafts k o of the pipe-cutter would have to be sufficiently long, and, furthermore, the bonnet 25 would be heavier to handle than one made of proper length to operate conveniently with the pipe-cutter, and having an auxiliary or separate shell 25ᶜ for use when the valve is to be inserted. The stem 29ª of the valve 29 is to be connected with rod 28, which is adapted to pass through bearing 26 and stuffing-box 27 of bonnet 25 to enable the valve to be lowered into the casing 2. For this purpose I have shown the rod 28, provided with a threaded stem 28ª, adapted to mesh with corresponding threads in a bore in the upper end of stem 29ª of valve 29. By this means when the valve is lowered into position and secured the rod 28 can be unscrewed from the valve to permit ready removal of the bonnet or cover; but other means may be provided for connecting rod 28 with the valve or for lowering the valve to the pipe.

The valve 29 is inserted in the space left by the cut-out section 1ª of the pipe 1 as follows: The cutter-carriers having been carried into bonnet 25 and the section 1ª of the pipe thus removed from the pipe, valve 10 is closed and the bonnet 25 then removed from the casing 2 and the pipe-cutter and cut-out section removed from the bonnet 25. Valve 29 is then placed in the upper part of the bonnet, connected with its rod 28, the shell 25ᶜ is secured upon flange 8ᶜ, and the bonnet with its contained valve 29 is then secured upon said shell. The valve 10 is then opened and valve 29 next lowered into casing 2 until its grooves 36 37 come in line with ribs 36ª 37ª or until the valve rests upon the stop 40 or is otherwise brought into proper position between the clamping devices on the pipe. One or both of the pinions or wheels 20 are now rotated to cause ring 18 to travel along sleeve 15, whereupon said ring will advance toward the valve and will press the latter against sleeve 14, so as to make a tight fit between the valve and said sleeve and the ring 18. The valve being now secured in position in the pipe, water can travel through the valve in the ordinary manner. Rod 28 and the bonnet 25 and shell 25ᶜ will next be removed from the valve and casing 2. The casing and its hubs 5 will next be removed from the pipe and the valve will be left exposed. The grooves 38 39 when used will next be packed or leaded, and the valve will be thus inserted in the pipe ready for use in the ordinary manner.

From the foregoing it will be seen that I am enabled to cut out a section of pipe and insert a valve between the severed ends of the pipe while the pipe is under pressure, or, in other words, without stopping the flow of water or other fluid through the pipe. This will be found of great advantage, as it often happens that it becomes necessary or desirable to insert a valve in a pipe while under pressure. The necessity of shutting off the flow of water during the time taken to put in a valve in the usual way might cause great damage to occur through the loss of fire protection, in addition to the inconvenience experienced by the inhabitants of the shut-off district; also, in a distribution system in connection with waterworks it would be found to advantage to insert a valve by my invention on each side of a leak or break in a pipe, by which means the leak or break could be repaired without shutting off the flow to any other parts of the system than the part between the two valves inserted. The casing and its attendant parts may of course be kept as a means for inserting valves generally, the only parts that will require replacing being the sleeves 14 15 and the ring 18, which of course remain on the pipe with the valves. It is evident that other means than bolts or screws may be provided for holding the sleeves, hubs, casing, and other parts upon the pipe and other corresponding parts.

If it is desired to additionally secure the valve to the sleeve or hub 14 and ring 18, I may provide a clamp B to fit over the flanges of said parts, the clamp having a set-screw C to hold the parts together, which clamp may be applied after the bonnet or the casing have been removed, (see dotted lines in Fig. 1,) or, if preferred, the flange of the valve and the sleeve or hub 14 and the ring 18 may be bolted together, said flange being provided with slots to receive bolts for the purpose, or other means may be provided for firmly or permanently connecting the flanges of the valve and the sleeve and hub together.

It is evident that the devices for securing the valve 29 between the severed ends of the pipe can be altered, that the means shown for moving the ring or sleeve 18 toward the valve can be changed, that the means for securing the casing tightly around the pipe can be modified, and generally that changes can be made in the form and arrangement of the various parts shown and described without departing from the spirit of my invention.

Having now described my invention, what I claim is—

1. A casing adapted to surround a pipe and having an opening to permit the passage of a valve that is to be connected with the pipe, combined with means adapted to connect the valve with the pipe while within the casing, substantially as described.

2. A casing adapted to surround a pipe and having an opening to permit the passage of a valve that is to be connected with the pipe, and means to close said opening to permit the valve to be connected with the pipe while the latter is under pressure, combined with means adapted to connect the valve with the pipe while within the casing, substantially as described.

3. A casing adapted to surround a pipe and having an opening to permit the passage of a valve that is to be connected with the pipe, and means to close said opening to permit the valve to be connected with the pipe, while the latter is under pressure, combined with a sleeve or ring adapted to encircle the pipe while within the casing, and means to move said sleeve or ring toward the valve to hold the latter between the severed ends of the pipe, substantially as described.

4. A casing adapted to surround a pipe and having an opening to permit the passage of a valve into the casing, a valve to close said opening, and a removable bonnet or cover adapted to contain the first-mentioned valve, and means to connect said bonnet or cover with said casing, combined with means adapted to connect the valve with the pipe while within the casing, substantially as described.

5. A divided or split casing having an opening or passage-way, a valve to close the latter and means for securing said casing upon a pipe, combined with clamping devices adapted to be secured upon the pipe within said casing and to receive and hold a valve between them while within the casing, substantially as described.

6. A divided or split casing adapted to be secured upon a pipe and having a passage-way or branch, a valve to close the latter, a bonnet or cover adapted to be secured in line with said passage-way or branch, and means for making a tight joint between the casing and pipe, combined with clamping devices adapted to be connected with the pipe within said casing to hold a valve between them, substantially as described.

7. A divided or split casing having apertures at its ends, means for clamping it upon a pipe, said casing having an opening or passage-way, a valve to close the latter, and divided or split hubs adapted to be clamped upon the pipe and removably connected with said casing to enable the casing to be secured fluid-tight upon pipes of different sizes, substantially as described.

8. A divided or split casing adapted to be clamped upon a pipe and having an opening or passage-way, and a valve to close the latter, combined with a sleeve or hub adapted to be clamped upon the pipe within the casing, and a sleeve or ring adapted to surround the pipe and to be moved toward said sleeve or hub to hold a valve between them, substantially as described.

9. A divided or split casing adapted to be clamped upon a pipe and having a branch or passage-way and a valve to close the latter, combined with divided or split sleeves or hubs adapted to be clamped upon a pipe within said casing, and means carried by one of said sleeves adapted to be moved toward the other sleeve to clamp a valve between it and the latter sleeve, substantially as described.

10. The combination of a divided or split casing adapted to be clamped upon a pipe and having a branch or passage-way and a valve to close the same, with divided or split sleeves or hubs adapted to be clamped upon a pipe within said casing, and a sleeve or ring carried by one of said sleeves adapted to be moved toward the other sleeve to clamp the valve between it and the latter sleeve, and means for operating said ring from without the casing, substantially as described.

11. The combination of a divided or split casing adapted to be clamped upon a pipe and having a branch or passage-way and a valve to close the same, with divided or split sleeves or hubs adapted to be mounted upon a pipe within said casing one of said sleeves or hubs having screw-threads, a ring mounted upon the latter sleeve and having threads to mesh with the threads carried by said sleeve, and means for rotating said ring to cause it to travel along the sleeve, substantially as described.

12. The combination of a divided or split casing adapted to be clamped upon a pipe and having a branch or passage-way and a valve to close the same, with divided or split sleeves or hubs adapted to be clamped upon a pipe within the casing, one of said sleeves or hubs having screw-threads, and a ring mounted upon said threaded sleeve and having threads to mesh with the threads carried by said sleeve, and a shaft projecting through said casing, and means within the casing for operating said ring by said shaft, substantially as described.

13. A divided or split casing, adapted to be clamped upon a pipe and having a passage-way or branch and a valve to close the same, combined with divided or split sleeves or hubs to be clamped upon a pipe within said casing, one of said sleeves or hubs having screw-threads, a divided or split ring adapted to be mounted upon one of said sleeves or hubs and having threads to mesh with the threads of the corresponding sleeve, gear-teeth carried by said ring, a pinion or gear-wheel to mesh with said teeth, and a shaft projecting through said casing, and adapted to operate said pinion or gear-wheel, substantially as described.

14. A divided or split casing adapted to be clamped upon a pipe and having a passage-way or branch and a valve to close the same, and a bonnet or hood adapted to be connected with the casing in line with said passage-way or branch, combined with means within the casing to hold a valve between the severed ends of the pipe and a stop arranged to regulate the position of the valve between said ends of the pipe, substantially as described.

15. A divided or split casing adapted to be clamped upon a pipe and having a passage-way or branch, and a valve to close the same, a bonnet or cover adapted to be connected with said casing in line with said passage-way or branch, and a pipe-cutter adapted to be placed upon a pipe within said casing and arranged to travel through said passage-way or branch and through said bonnet or cover, and a bearing and stuffing-box carried by said bonnet to receive the operating-shaft of said pipe-cutter combined with means arranged to be contained within the casing to hold a valve between the severed ends of the pipe, after the pipe-cutter and a section of the pipe have been removed, substantially as described.

16. A divided or split casing adapted to be clamped upon a pipe and having a passage-way or branch, and a valve to close the same, a bonnet or cover adapted to be connected with said casing in line with said passage-way or branch, and a pipe-cutter adapted to be placed upon a pipe within said casing and arranged to travel through said passage-way or branch and through said bonnet or cover, and a bearing and stuffing-box carried by said bonnet to receive the operating-shaft of said pipe-cutter, combined with clamping devices adapted to be secured upon the pipe within said casing on opposite sides of said pipe-cutter, and means comprised in said clamping devices for clamping a valve between the severed ends of the pipe after the pipe-cutter and a section of the pipe have been removed, substantially as described.

17. A divided or split casing adapted to be clamped upon a pipe and having a passage-way or branch and a valve to close the same, a shell adapted to be connected with said casing in line with said passage-way or branch, and a bonnet or hood adapted to be secured upon said shell, combined with valve-holding devices adapted to be mounted upon a pipe within said casing, to hold a valve in the line of pipe, and means for operating said clamping devices from without the casing, substantially as described.

18. The combination of a divided or split sleeve or hub adapted to be clamped upon a pipe, with another divided or split sleeve or hub also adapted to be clamped upon a pipe, a divided or split ring adapted to be mounted upon the said last-mentioned sleeve or hub and means for moving said ring along its respective sleeve or hub whereby a valve may be clamped in a line of pipe between said sleeves or hubs, substantially as described.

19. The combination of a divided or split sleeve or hub adapted to be clamped upon a pipe, with another divided or split sleeve or hub also adapted to be clamped upon a pipe, the last-mentioned sleeve or hub having peripheral screw-threads, a divided or split ring adapted to be clamped upon the last-mentioned sleeve or hub and having threads to mesh with the threads of said sleeve or hub, and means for rotating said ring upon the latter to cause it to travel along the pipe, substantially as described.

20. The combination of a divided or split sleeve or hub adapted to be clamped upon a pipe, with another divided or split sleeve or hub also adapted to be clamped upon a pipe, the last-mentioned sleeve or hub having peripheral screw-threads, a divided or split ring adapted to be clamped upon the last-mentioned sleeve or hub and having screw-threads to mesh with the threads of said sleeve or hub, said ring having gear-teeth, a pinion or wheel to mesh therewith, and means for operating said pinion or wheel to cause said ring to rotate around the corresponding sleeve substantially as described.

21. The combination of a divided or split sleeve or hub adapted to be clamped upon a pipe, with another divided or split sleeve or hub also adapted to be clamped upon a pipe, a divided or split ring adapted to be mounted upon the last-mentioned sleeve or hub, and means for moving said ring along the latter, with a valve adapted to be clamped between said first-mentioned sleeve or hub and said ring, and corresponding recesses and projections located between said valve and the first-mentioned sleeve or hub and the ring, substantially as described.

22. The combination of a casing adapted to be secured upon a pipe, said casing having openings in opposite sides or ends, combined with divided or split hubs adapted to be clamped upon the pipe to close said openings in the casing, and means for securing said hubs to said casing, substantially as described.

MORRIS R. SHERRERD.

Witnesses:
ALEX. M. LINNETT,
ALLEN L. LOZIER.